Oct. 9, 1962    A. M. WELLINGTON ETAL    3,057,082
TEST SCORING, RECORDING, AND TEACHING APPARATUS
Filed March 21, 1961    3 Sheets-Sheet 1

INVENTORS
ARTHUR M. WELLINGTON
BY THOMAS C. WELLINGTON
JAMES W. BRUCE

Robert B. Harmon  ATTORNEY

Oct. 9, 1962  A. M. WELLINGTON ETAL  3,057,082
TEST SCORING, RECORDING, AND TEACHING APPARATUS
Filed March 21, 1961  3 Sheets-Sheet 2
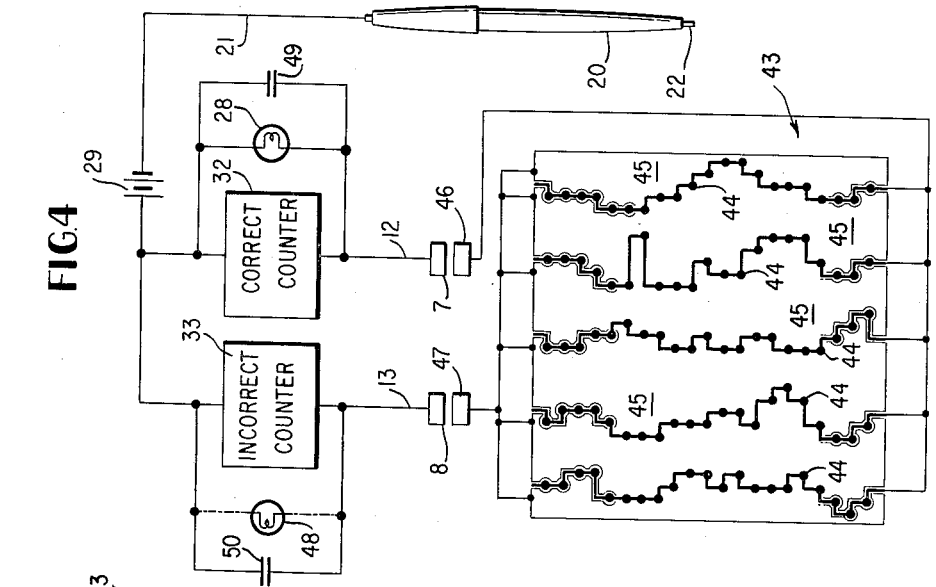
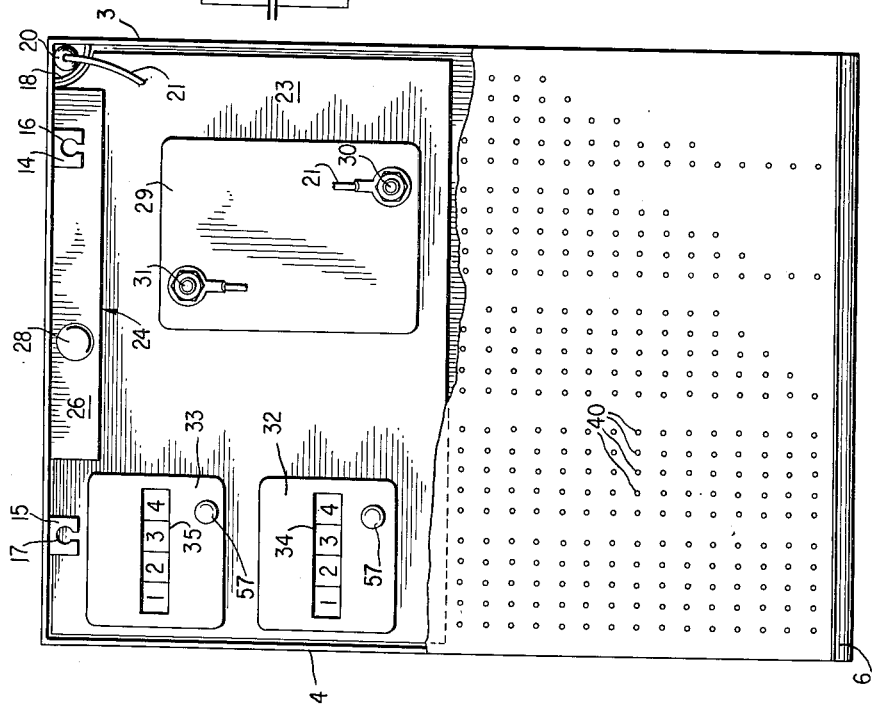
INVENTORS
ARTHUR M. WELLINGTON
THOMAS C. WELLINGTON
JAMES W. BRUCE
BY
Robert B. Harmon
ATTORNEY Oct. 9, 1962 A. M. WELLINGTON ETAL 3,057,082
TEST SCORING, RECORDING, AND TEACHING APPARATUS
Filed March 21, 1961
3 Sheets-Sheet 3

INVENTORS
ARTHUR M. WELLINGTON
THOMAS C. WELLINGTON
JAMES W. BRUCE

BY Robert B. Harmon

ATTORNEY

_United States Patent Office_

3,057,082
Patented Oct. 9, 1962

3,057,082
TEST SCORING, RECORDING, AND TEACHING APPARATUS
Arthur M. Wellington, State College, Thomas C. Wellington, Boalsburg, and James W. Bruce, State College, Pa., assignors to HRB-Singer, Incorporated, State College, Pa., a corporation of Delaware
Filed Mar. 21, 1961, Ser. No. 97,352
14 Claims. (Cl. 35—9)

The present invention relates generally to teaching and testing devices for use in the administering, scoring, and recording of the results of multiple choice type examinations and in the teaching through such testing. The simultaneous and instantaneous functions of teaching, testing, scoring, and recording are uniquely combined in the present device.

Due to the inherently difficult and time consuming task of translating, interpreting, evaluating and scoring of the traditional essay type tests, the recent trend has been to utilize the multiple choice type test whenever possible. This has especially been the case where substantial numbers of students are involved, such as in the test selection procedures for the Armed Forces. Also, instances where not only substantial numbers of students are involved but the problem of frequent and regular testing arises, the multiple choice type test is almost invariably used.

In devising the multiple choice test, a relatively large number of items are presented to the student, with each item containing an assertion and a question. Usually from 2 to 5 alternative responses are provided per item, and it is the task of the student to select the alternative response that is correct or most appropriate. Presumably, each alternative is inherently, equally attractive to the uninformed student, but only one is the correct answer. Hence the uninformed student should do no better than chance in identifying the correct alternative, and the knowledgeable student should do far better than chance. Although tests such as this are usually difficult to devise, once a series of items has been prepared, testing and scoring is a relatively simple matter compared to the testing and scoring of the traditional essay type test.

In the situation involving unusually large numbers of students and the necessity for quickly ascertaining the test results, even multiple choice test scoring and recording is a serious problem. The usual method of administering the multiple choice test is to provide the student with a question booklet or sheet, a pencil and an answer sheet with the answer sheet having numbers which correspond to the items on the question sheet. Each number on the answer sheet also has along its side a series of letters (usually 4 to 5) which match the letters which identify the alternative responses to each of the items on the question sheet. The student answers the test by circling, marking or otherwise indicating the letters that correspond to what he believes are the correct alternatives to the matching items on the question sheet. One of the practiced methods of scoring such examinations is by using a special scoring machine through which the answer sheets are processed. When thousands of answer sheets are to be processed within a short time, a battery of such scoring machines is required in order to prevent a backlog of unscored answer sheets. As may well be understood, these machines are expensive and often present a problem of error in scoring. A second method, which may be entirely impractical depending on the number of tests, is the method of hand scoring or comparing of the answer sheets with a key or overlay sheet. This method, of course, introduces the factor of human error in the scoring and consumes much valuable instructor and assistant instructor time.

A still further technique, which is finding some acceptance, is a method whereby the student marks a card which is then inserted into a card punching machine in which the student's marks are punched out. After the punching step, the cards are then processed by sorting machines, and through a series of sorts, items are scored and the total scores are obtained.

The present invention is designed to obviate the cumbersome, time consuming and often error laden methods of scoring and recording results from multiple choice examinations. The present invention has, therefore, for its primary object the presentation of a new and improved test scoring recording and teaching apparatus of a simplified structure for testing and automatically scoring and recording a student's performance on multiple choice tests.

Another object of the present invention is to provide an apparatus for administering multiple choice tests in such a manner that the student is instantaneously apprised of the correctness of his choice by a visual indicating means.

A more specific object of the present invention is to provide an apparatus for administering multiple choice tests in such a manner that the student is instantaneously apprised of his performance on the total test as indicated by the digits visible on a counter or counters.

Another object of the present invention is to provide a testing apparatus for multiple choice examinations wherein the student's score on the examination is instantaneously and automatically recorded and a permanent record sheet is provided.

A further object of the present invention is to provide a multiple choice testing device in which the student is aided in the learning process by visually observing his progress by means of a signal light, thus embodying a feedback or reinforcing principle of learning.

A further object of the present invention is to provide a testing device of the type described in which it is not necessary to program the instructional material to adapt the machine to the human learning process.

A still further object of the present invention is to provide a testing device for multiple choice tests which is adapted for standard tests or for individual instructor examinations and is of a simple and inexpensive construction which makes practical use of the device for each person in a large group being tested simultaneously.

The means by which the foregoing objects and other advantages, which will be apparent to those skilled in the art, are accomplished, are set forth in the following specification and claims, and are illustrated in the accompanying drawings dealing with the preferred embodiment. Reference is made now to the accompanying drawings in which:

FIGURE 2 is a top plan view of the device shown in FIGURE 1 having a portion of the top cover plate removed to illustrate the physical arrangement of certain component parts.

FIGURE 4 is a wiring diagram of the electrical circuit to be used in the preferred embodiment of the device shown in FIGURES 1 to 3.

Figure 1:
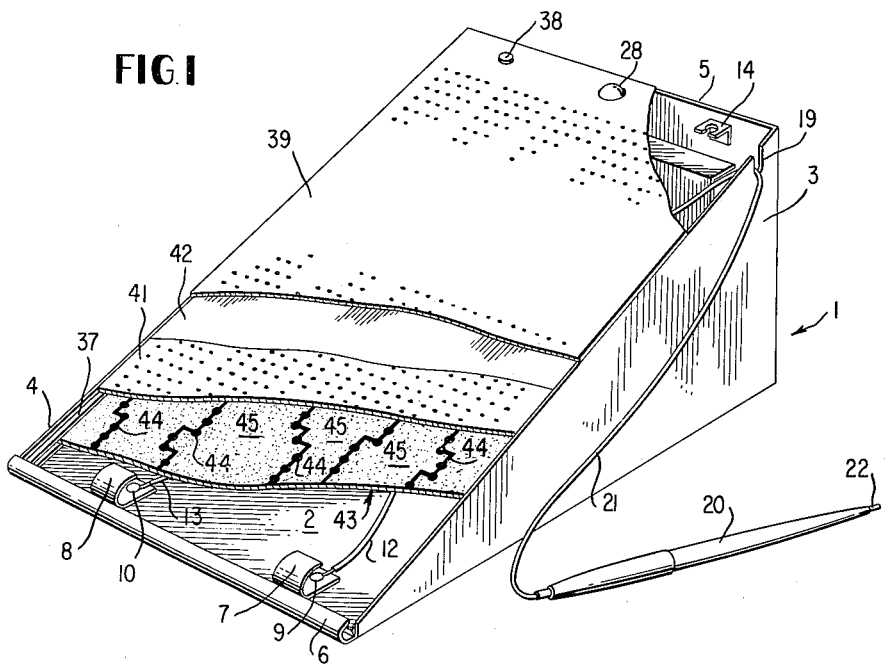
FIGURE 1 is a perspective view of the entire assembled device having certain parts cut away to show details of construction.

Referring now to the drawings, wherein like reference numerals are used to indicate identical parts in the various views, the preferred embodiment of the present invention comprises a generally wedge shaped hollow container 1 having a bottom 2, identical triangularly shaped vertical side walls 3 and 4, and a vertical rectagular back wall 5. The entire hollow container 1 may be formed from sheet metal or any other suitable material with the wall members and the bottom of the container being joined together by any one of a number of well known methods. The bottom 2 of the container also has a reversely curved end portion or lip 6 which extends the entire width of the bottom for a purpose presently to be described.

Mounted on the bottom 2 of the container and within the body of the container are two leaf contact members 7 and 8 which are securely fastened to the bottom of the container by suitable attaching means 9 and 10 respectively. The contact members 7 and 8 are electrical conducting elements preferably formed from a very light weight, resilient, sheet metal and are electrically insulated from the metal container by a small piece of insulating material 11 located between the leaf contacts and the bottom 2 of the container. The contact members 7 and 8 also have lead wires 12 and 13 respectively in electrical contact therewith. The function of the lead wires and the contact members will be explained in connection with the operation of the electrical circuit utilized in connection with the present invention.

Mounted on the back wall of the container are two supporting and positioning angle brackets 14 and 15 located near the top edge of the back wall 5 and attached thereto by any suitable means such as spot welding. The supporting brackets 14 and 15 have holes 16 and 17 respectively, located in the horizontal legs thereof. The purpose of these brackets is to support and position the top cover plate of the testing device which will be presently described. To complete the structure of the container, an upright curved wall section 18 is secured in the upper right hand corner of the container as viewed in FIGURE 2 and forms a storage space for a stylus when the stylus is not in use. The side wall 3 of the container is further characterized by having an upwardly opening slot 19 formed in its sloping edge closely adjacent to the stylus storing position to permit the passage of an electrical cord therethrough when the top cover plate is placed into position.

A stylus 20 having an electrical connecting cord 21 and a contact point 22 is provided for the testing apparatus and is designed to be normally stored in the space provided by the curved wall section 18 when not in use. The stylus 20 is shown removed from the storage space in the container in FIGURE 1 with its cord 21 passing through the slot 19 in the wall 3 ready for use by the student.

A self contained control unit is provided for use with the testing device and may be designed to be either removably mounted within the deep end of the container 1 or permanently secured thereto by any suitable means. The control unit is shown mounted in position within the container in FIGURES 2 and 3 and comprises a flat rectangular base plate 23, a signal mounting bracket 24 including a vertical support 25 and a horizontal shelf 26. An electrical socket member 27 is carried by the horizontal shelf 26 and receives a miniature light bulb 28 in a well known manner.

Figure 3:
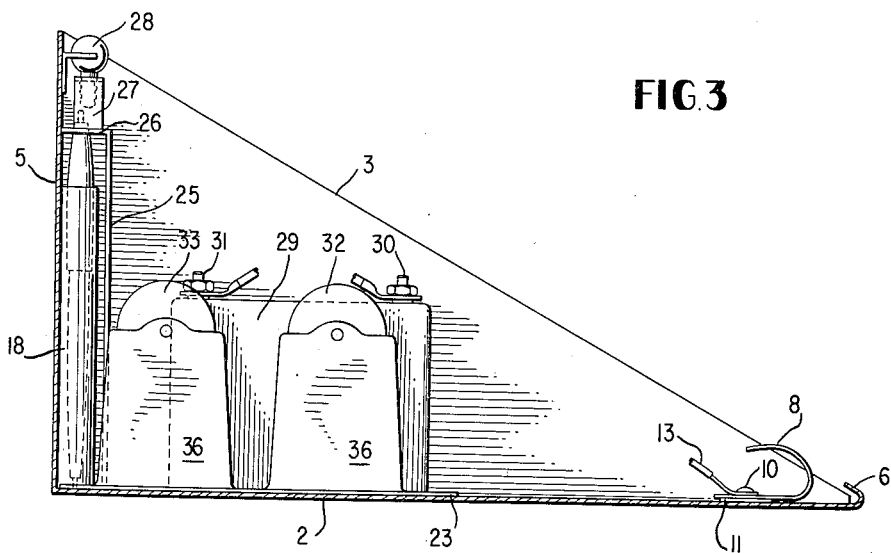
FIGURE 3 is a side elevational view of the device having the side panel removed to illustrate the arrangement of the parts.

A conventional dry cell 29 is shown mounted on the base plate 23 and includes the usual terminals 30 and 31 to which lead wires are attachable. It is obvious, however, that a plurality of such dry cells connected in series could be used, depending upon the power requirement of any specific setup. In cases where it is desirable to use the regular alternating current supply at home or school, the unit 29 would represent a suitable transformer. Also mounted on the base plate 23 are two electromechanical counters 32 and 33 having score viewing windows 34 and 35 respectively. These counters are of a well known type and may, if desired, be equipped with a settable to zero feature, controlled by push button 57. As illustrated in FIGURE 3, the counters 32 and 33 include suitable supporting brackets 36. For purposes to be explained, the counter 32 is designated the "correct counter" and counter 33 is designated the "incorrect counter."

The top cover plate when assembled, as shown in FIGURE 1, comprises a composite laminated unit supported by a frame 37 which in turn is supported on the container at one end by the brackets 14 and 15 and fitted within the curved lip 6 of the bottom as illustrated. To further secure the top plate unit in position, pins such as 38 may be passed through suitable holes in the members of the top plate and into the holes 16 and 17 of the brackets 14 and 15. A third opening may be provided in the laminated members of the cover plate to allow the bulb 28 to be clearly visible therethrough to the student as shown in FIGURE 1. Other means, not shown, may be provided for viewing the bulb such as a lens or a translucent portion of the container or cover plate. Considering now the details of a top cover plate, the topmost sheet 39 may be made from an opaque or translucent plastic or the like and includes, in the preferred embodiment, multiple columns of perforations 40, each column containing individual rows of at least five perforations, as illustrated in FIGURE 2. These columns and rows of perforations 40 will be designed to identically match the items and alternative choices indicated on the particular multiple choice examination sheet given to the student. A second perforated plastic sheet 41 is also carried by the frame and the perforations therein match the perforations 40 of the top sheet 39. A blank sheet of punctureable paper 42 is placed between the two plastic perforated sheets and functions as a permanent record of the student's choice of alternative answers for any given test.

The bottom most member of the laminated top cover unit constitutes a printed circuit board 43 the material of which may be composed of plastic or any other suitable non-conductor material. Five electrically conductive contact strips 44 are plated upon the base material with one conductive strip underlying each of the five columns of perforations in the layers 39 and 41. The conductive strips 44 are arranged to follow the particular pattern of correct selections of perforated alternatives as the student progresses upwardly or downwardly along the individual columns of perforations. The areas 45 of the printed circuit board between the electrically conductive strips 44 are also plated with a conductor material which is insulated from the conductive material of the strips 44 so that when the stylus contact point 22 is inserted through the perforations in the sheets 39 and 41 it will make contact with either one of the strips 44 or a portion of the conductive material in the areas 45. With the physical arrangement of the component parts of the testing device being thus in mind, attention now is directed to the schematic wiring diagram shown in FIGURE 4 in which the several elements so far described bear identical reference numerals. The structural relationship between the conductive elements of the printed circuit board 43 is clearly shown in FIGURE 4, and it will be noted that the conductive portions 45 are spaced and insulated from the conductive strips 44, with all five of the strips 44 being electrically connected to a circuit board metallic contact 46 which will be located on the back side of the circuit board and which will contact the leaf member 7 of the container when the cover plate is placed in position. Likewise, all of the conductive areas 45 are electrically connected together and to a second circuit board metallic contact 47 also located on the back side of the circuit board and which will contact the leaf member 8 of the container. The electrical lead 12, fixed to the contact 7 is then connected to the correct answer counter 32, which in turn is electrically connected to the terminal 31 of the power source such as a battery or transformer 29. As seen in FIGURE 4, the signal light bulb 28 is connected in parallel relationship with the counter 32 in such a manner that when an electrical current passes through any one of the strips 44 and the correct counter 32, the signal light 28 will be caused to glow. In like manner, the contact 8 is connected to counter 33 by means of a lead 13 and then is connected to the same terminal 31 of the battery or transformer 29 as is the counter 32. As also indicated in FIGURE 4, the electrical circuitry of the present device may include a second signal light 48 in parallel relationship with the incorrect counter 33 to indicate the actuation of said counter if desired. The second signal light 48 is not shown in the other views of the device and may be utilized as a manner of choice. As further illustrated in FIGURE 4, current delay devices 49 and 50 are placed in parallel with the counters 32 and 33 respectively. In their simplest form, these delay devices constitute capacitor units. To complete the construction, the opposite terminal 30 of the power source is connected to the stylus 20 by the lead 21.

As is evident, when the contact point 22 of the stylus is inserted by the student through a pair of aligned perforations in the sheets 39 and 41, the blank sheet 42 will be perforated and will constitute a permanent record of the student's choice. With each choice of alternatives by the student, the contact point 22 will also connect with either a point on one of the conductor strips 44 or with a portion of the conductive area 45 and complete a circuit either through the correct counter 32 or through the incorrect counter 33 and the power source 29, as the case may be. When this occurs the student will be apprised immediately by the glowing of the light 28 of a correct answer and in the case of the utilization of a second light 48, of an incorrect answer. With this operation, a running total of the correct choices and the incorrect choices will also be registered by the counters 32 and 33.

The discharging of the capacitors or time delay devices 49 and 50 has the specific and advantageous function of aiding in prevention of a possible double registry of a choice made by the student in the following manner. In the event that the student is either nervous or hesitant about making a particular choice with the stylus, the inherent operation of the set up would be to originate two or more signals, depending upon the number of contacts made, to the counter units resulting in the registering of more than one choice. With the use of the capacitors 49 and 50, an increment of time will be required between the charging and discharging of the capacitors to aid in the prevention of multiple completion of the circuit in the case of a nervously or hesitantly made choice.

Figure 5:
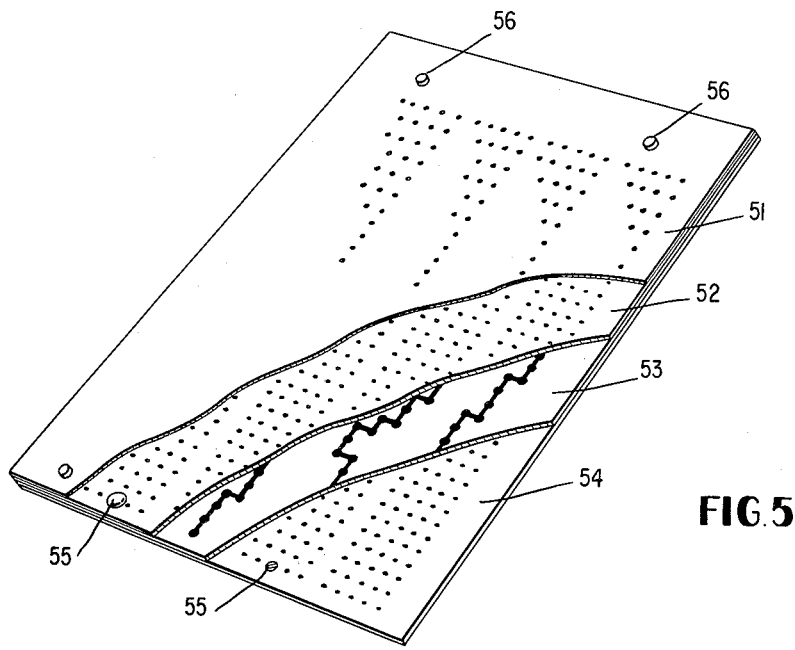
FIGURE 5 is a perspective view of an alternative embodiment of a composite laminated cover plate having certain parts cut away to show details of construction.
Figure 6:
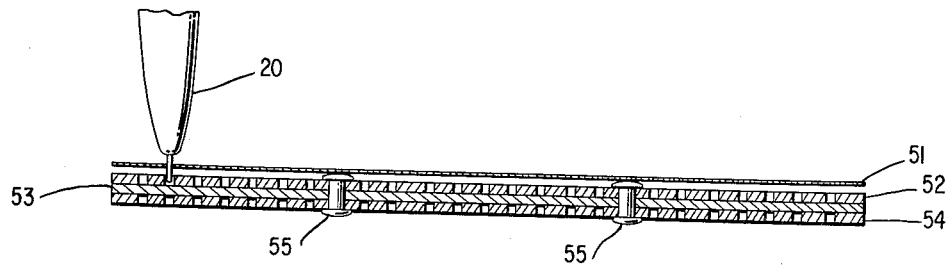
FIGURE 6 is an end elevational view partly in section of the cover plate shown in FIGURE 5.

Referring now to FIGURES 5 and 6, an alternative form of top cover unit is illustrated which is equally desirable for use with the container and control unit described and illustrated in FIGURES 1–4. The top cover unit of FIGURES 5 and 6 functions in combination with the rest of the device in the same manner as the previously described cover unit, requires no alterations thereof and provides certain advantages thereover in the way of simplicity of construction and increased opportunity for variation of test patterns.

The essential structure of the cover plate unit of FIGURES 5 and 6 comprises the top sheet 51 which represents the student's answer sheet, which is merely a sheet of unperforated paper bearing multiple columns and rows of printed dots or small circles. The printed marks on the answer sheet 51, as in the case of the perforations of the top perforated sheet 39 of the previous embodiment, are designed to identically match the items and alternative choices indicated on the particular multiple choice examination sheet or booklet given to the student. In the present case, the sheet 51 may also be numbered or lettered identically with the examination booklet and may also include other printed matter to identify the test and the student, if desirable. In addition to the matter just described, the answer sheet 51 further includes four precisely located and punched holes adjacent its four corners for a purpose which will be explained.

The remaining portion of the cover unit comprises a composite laminated section including a first opaque perforated plastic sheet 52, an intermediate printed circuit board 53 and a second opaque perforated plastic sheet 54. As shown in FIGURES 5 and 6, the members 52, 53 and 54 are permanently secured together by means of rivets 55 composed of a metal such as copper or any other suitable electrically conductive metal. The rivets 55 are four in number, two being laterally spaced adjacent the lower edge of the lamination and the remaining two being laterally spaced adjacent the upper edge of the lamination. As seen most clearly in FIGURE 6, the rivets extend completely through the members 52, 53 and 54 and include enlarged flattened head portions on the outer surfaces of the sheets 52 and 54. The flat rivet heads are so located on the surfaces of the perforated sheets that when the entire cover plate is placed on the container 1, the rivet heads located and exposed on the surface of the bottom sheet will make positive contact with the leaf contacts 7 and 8 of the container.

When the members 52, 53 and 54 are in the assembled position, the perforations of the sheet 52 will be perfectly aligned with the identical perforations of the sheet 54 and four holes will be provided and will extend completely through the assembly to match the four holes previously described as being located in the four corners of the answer sheet 51. With this construction, suitable pegs or pins 56 shown in FIGURE 5 may be inserted through the entire cover plate to perfectly align the marks on the answer sheet with the perforations in the sheets 52 and 54. It will also be apparent that the pegs 56 will further serve to locate the cover plate on the container by engagement with the holes 16 in the brackets 14 of the container. Thus, the sheet 51 may be placed either on the surface of the perforated sheet 52 or on the surface of sheet 54, and the laminations 52, 53 and 54 may be turned completely up-side-down or turned end-for-end in either of the positions. It will also be noted that in any one of its four positions, at least two of the four rivets 55 will contact the members 7 and 8 of the container, two of the pegs 56 will be available for engagement with the brackets 14 and the answer sheet may be placed in proper position to cover the topmost perforated sheet whether it be 52 or 54.

Looking now to the printed circuit board 53 of FIGURES 5 and 6, the construction thereof is similar to the construction of the circuit board 43 of the first embodiment except for the fact that both sides of the board 53 are plated with contact strips and conductive areas similar to the strips 44 and areas 45 of the board 43. The contact strips of either side of the board 53 constitute a pattern of correct selections and the conductive areas constitute the remaining pattern of incorrect selection of any given examination with the strips and intervening areas being insulated from each other as in the case of the board 43. For the purpose of completing the proper electrical circuit, all of the contact strips of each side of the board 53 will be electrically connected to the one of the rivets 55 which is in contact with the leaf contact 7 at one end of the board and to the diagonally opposite rivet so that when the board is turned end-for-end the correct contact strips will still be connected with the correct counter circuit. The same situation is true for the conductive areas which are all electrically connected to the rivet which is in contact with the incorrect counter circuit regardless of the position of the unit. FIGURE 6 illustrates the mode of operation of the present embodiment wherein the student makes his choice by perforating the selected choice of marks on the answer sheet 51 with the probe 20 which then passes through the opaque plastic sheet, either 52 or 54, and contacts the printed circuit board 53, thus completing an electric circuit through either the correct counter or the incorrect counter. With the embodiment of the top cover unit just described it is thus possible to obtain four entirely different patterns of the printed circuit board by merely turning the board including the perforated sheets 52 and 54 up-side-down and end-for-end in either of the positions. The student is also able to refer back to his previous selection since the perforated answer sheet 51 is on top of the cover unit and the opaque plastic sheets 52 and 54 completely obscure the printed circuit board from view.

Having described the structure and operation of the preferred embodiment and the alternative embodiment of FIGURES 5 and 6, a description will now be set forth of the alternative possibilities of utilization of the present device, with reference to the preferred embodiment, in the administering of multiple choice examinations.

Prior to administering the examination, the control unit is mounted within the container in the aforementioned manner and the stylus 22 is removed from its holder within the container and made ready for use. The perforated sheets, the record sheet and the printed circuit board are assembled in the frame 37 and placed in position on top of the container with the pins 38 being placed in position to secure the unit and with the light bulb 23 being visible through the hole in the assembly or other viewing means. It will be noted, of course, that the printed circuit board 43 will not be visible to the student because of the opaque blank-answer sheet and the opaque or translucent perforated sheets 39 and 41. Each student is then provided with a question sheet with the items and correct alternatives thereof corresponding to the columns of perforations and the contact strips 44 on the circuit board. After reading the question, the student selects the answer by inserting the stylus tip through the top perforated plate 39, piercing the answer sheet between the plates, and then through the second perforated plate, until contact is made with the printed circuit board 43. If the student's choice was correct, the conductor strip 44 will be contacted and the circuit through the correct counter and light 28 and battery 29 will be completed, advancing the counter one number and notfying the student of his correct selection. If in the alternative, the answer selected was the wrong one, one of the areas 45 will be contacted by the stylus point and the circuit through the incorrect counter and through an incorrect counter light 48, if one is used, will be completed to register the incorrect choice and to inform the student of his incorrect choice.

In the event that the device is being used for teaching in addition to testing, the advantages of the operation just described will be quite apparent. That is to say, in making provision for informing the student of his progress by means of a signal light, the feedback or reinforcing principle of learning is employed. The light, which signals a correct test item answer, provides an instant "reward," or an instant opportunity for correction on wrong answers so that the student can try another response until he gets the right answer. Thus, the student gets the correct answer to each question before he attempts the next.

The operation of the electrical control unit including the correct and incorrect counters, the signal means and the selector probe or stylus 20 is identical to that described in the operation of the preferred embodiment when the alternative embodiment of the top cover plate shown in FIGURES 5 and 6 is utilized. The difference in overall effect gained by the use of the cover plate of FIGURES 5 and 6 is that of the advantage given to the student of having the answer sheet before him throughout the examination and the advantages gained by the availability of multiple patterns of the circuit board made possible by the arrangement of the perforated opaque sheets, double sided circuit board and answer sheet as described.

It will be readily apparent to those skilled in the art that the present invention provides novel and useful improvements in simultaneous testing, scoring, recording and teaching devices and that the arrangement and types of structural components utilized may be subject to numerous modifications and variations within the purview of this invention. The applicant herein intends only to be limited to a liberal interpretation of the specification and appended claims.

Having thus described the invention, what is claimed as new and desired to be secured by Letters Patent is:

1. An educational teaching and testing device comprising, a hollow container, a removable control unit mounted in said container, said control unit including a power source, a pair of counters in circuit with and each having one terminal connected to one terminal of said power source, signal means connected in parallel with one of said counters, and an electrical contact element for each of said counter circuits, a printed circuit board having a plurality of electrically conductive strips thereon and connected together and to a first contact point on said board, a plurality of electrically conductive areas between and insulated from said strips, said conductive areas being connected together and to a second contact point on said board, means for positioning said circuit board on said container with the first and second contact points on said board engaging the respective contact elements of said counter circuits, and an electrically conductive selector instrument connected to the other terminal of said power source for selectively completing a circuit through either of said conductive portions of said circuit board and its counter unit.

2. The apparatus defined in claim 1 wherein, a time delay means is inserted in the circuit in parallel with each of said counters.

3. An educational testing device comprising, a hollow container, a power source in said container, a pair of counters each having one terminal connected to one terminal of said source, signal means in parallel with at least one of said counters, a printed circuit board having a plurality of electrically conductive strips thereon connected together and to one of said counters, a plurality of electrically conductive areas between and insulated from said strips, said conductive areas being connected together and to the other of said counters, and an electrically conductive probe connected to the other terminal of said power source for selectively completing a circuit through either of said conductive portions of said circuit board and its counter unit.

4. The device defined in claim 3 wherein a time delay means is inserted in the circuit in parallel with each of said counters.

5. In a testing device having a source of electric current, a pair of counters each having one terminal connected to one terminal of said current source, signal means connected in parallel with said counters, and an electrically conductive probe connected to the other terminal of said current source, a laminated answer selecting unit comprising; first and second perforated plates, a puncturable sheet located between said plates and a printed circuit board underlying said perforated sheets, a plurality of conductor strips on said board underlying certain of said perforations, electrically conductive material on the surface of said board between said strips and insulated therefrom, and means to connect all of said strips to one of said counters and all of said conductive material to said other counter, whereby an electrical circuit may be completed by contacting either said conductive material or said strips with said probe.

6. In a testing device having a source of electric current, a hollow container, a pair of counters each having one terminal connected to one terminal of said current source, signal means connected in parallel with said counters, and an electrically conductive probe connected to the other terminal of said current source, a laminated answer selecting unit comprising; first and second perforated plates having aligned perforations, a puncturable sheet located between said plates and a printed circuit board underlying said perforated plates, a plurality of conductor strips on said board underlying certain of said perforations, electrically conductive material on the surface of said board between said strips and insulated therefrom, means to connect all of said strips to one of said counters and all of said conductive material to said other counter, and frame means to mount said laminated unit on said container.

7. The apparatus defined in claim 5 wherein, said laminated unit includes an orifice for receiving said signal means so as to be visible on said perforated sheets.

8. The apparatus defined in claim 6 wherein, said signal means comprises a lamp and said laminated unit includes an orifice for receiving said lamp.

9. A testing device comprising in combination, a power source, first and second counters, first and second signal means, a printed circuit board having electrically connected conductive strips thereon, a plurality of electrically connected conductive areas between and insulated from said strips, a probe, and wiring means to electrically connect said first counter, said first signal means and said conductive strips or said second counter, said second signal means and said conductive areas in series with said current source and said probe whereby said probe may be contacted with either said strips or said conductive area to complete a circuit through said source of current.

10. A testing device comprising in combination; a source of current, first and second counters each having one terminal connected to one terminal of said source, signal means in parallel with at least one of said counters, a circuit board having first and second conductive areas on its surface insulated from each other, means to connect said first and second counters to said first and second conductive areas respectively, a probe connected to the other terminal of said current source, a perforated lamination carried by said circuit board and overlying said conductive areas, whereby said areas will be concealed while permitting said probe to contact said circuit board at selected points.

11. In a testing device having a source of electric current, a hollow container, a pair of counters each having one terminal connected to one terminal of said current source, signal means connected in parallel with said counters, and an electrically conductive probe connected to the other terminal of said current source, a laminated answer selecting unit comprising; first and second perforated plates having aligned perforations, a printed circuit board positioned between said plates, a plurality of conductor strips on both sides of said board underlying certain of the perforations of said plates, electrically conductive material on both sides of said board between said strips and insulated therefrom, electrical contact means on the surfaces of said first and second perforated plates for connecting all of the strips on the circuit board to one of said counters and all of said conductive material to said other counter, a puncturable answer sheet and means to accurately position said answer sheet on the exposed surface of either of said perforated plates.

12. The apparatus defined in claim 11 wherein, time delay means are inserted in the circuit in parallel with each of said counters.

13. A testing device comprising in combination; a source of current, first and second counters, first and second signal means, a printed circuit board having electrically connected conductive strips on both sides thereof, a plurality of electrically connected conductive areas between and insulated from said strips, a probe, and electric circuit means to selectively connect said first counter, said first signal means and said conductive strips or said second counter, said second signal means and said conductive areas, in series with said current source and said probe whereby said probe may be contacted with the strips or the conductive areas on either side of said circuit board to complete a circuit through said source of current.

14. The apparatus defined in claim 10 wherein, a puncturable sheet is located on one side of said perforated lamination for providing a permanent record of the perforations made in said sheet.

References Cited in the file of this patent

UNITED STATES PATENTS

| | | |
|---|---|---|
| 1,647,276 | Daman | Nov. 1, 1927 |
| 2,148,259 | Cisin | Feb. 21, 1939 |
| 2,586,710 | Pick | Feb. 19, 1952 |
| 2,793,446 | Childs | May 28, 1957 |